United States Patent Office 2,709,088
Patented May 24, 1955

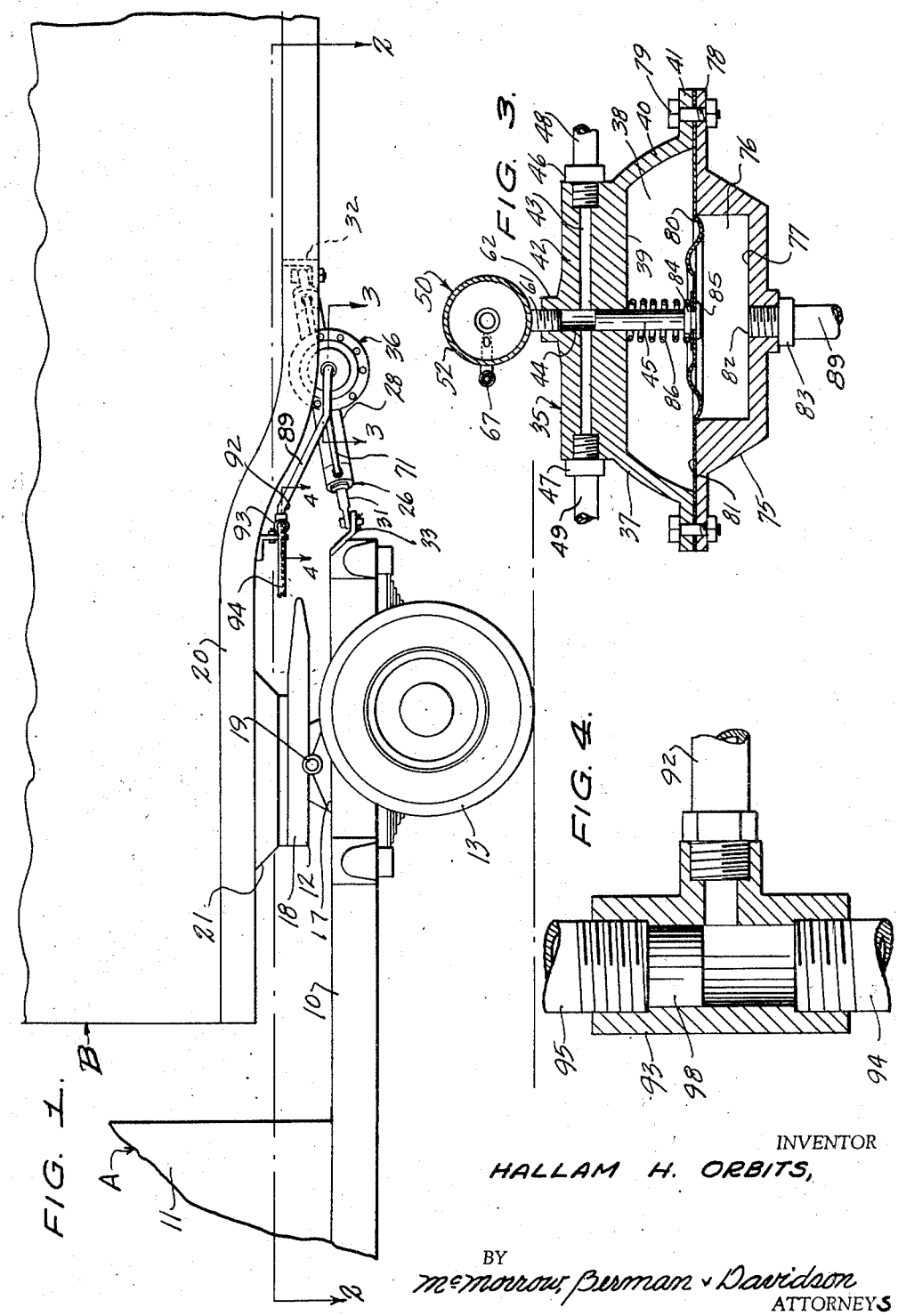

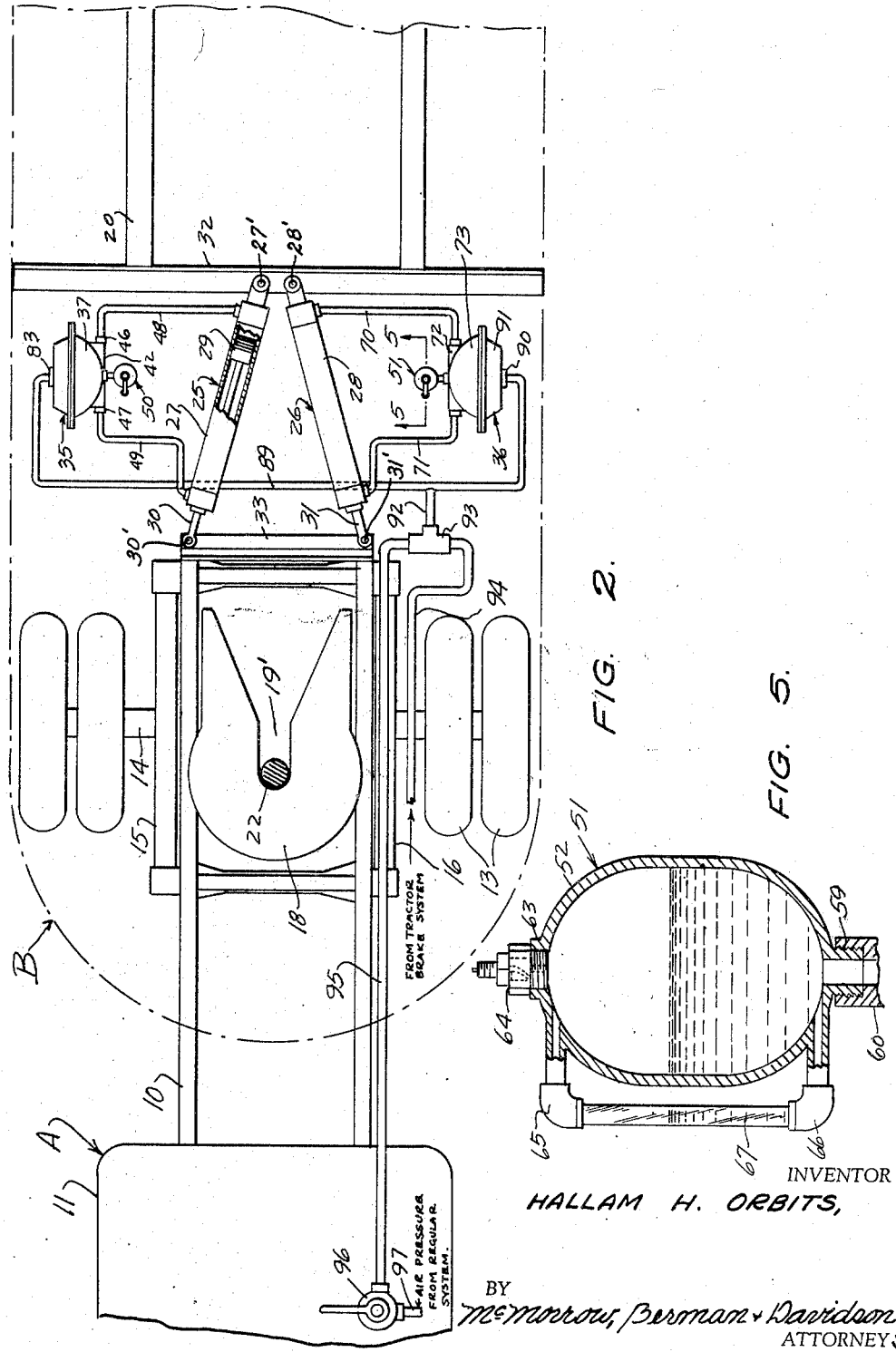

2,709,088

ANTI-JACK KNIFING CONNECTION FOR TRACTOR-TRAILER VEHICLE ASSEMBLY

Hallam H. Orbits, Fort Worth, Tex.

Application March 11, 1952, Serial No. 276,020

6 Claims. (Cl. 280—432)

This invention relates to connections for tractor-trailer vehicle assemblies and more particularly to a connection which is rendered effective upon application of the vehicle brake or by the operator of the vehicle to resist excessive relative turning movements between the tractor and trailer resulting in a condition referred to in the industry as "jack-knifing."

It is among the objects of the invention to provide an improved connection for the tractor and trailer units of a tractor-trailer vehicle assembly which is effective to resist excessive turning movements of the tractor and trailer units relative to each other and thereby minimize jack-knifing of the vehicle; which includes hydraulic devices connected between the tractor and trailer or semi-trailer units of a vehicle and rendered effective by full application of the vehicle brakes to resist relative turning movement between the tractor and semi-trailer units; which can be manually rendered effective by the vehicle driver independently of the vehicle brakes if desired; which can be installed on an existing tractor-trailer vehicle with no material modification of the vehicle construction; and which is simple and durable in construction, economical to manufacture and install, and positive and effective in operation.

Other objects and advantages will become apparent from a consideration of the following description and the appended claims in conjunction with the accompanying drawings wherein:

Figure 1 is a fragmentary side elevational view showing the rear portion of a tractor and the front portion of a trailer vehicle with a fifth wheel assembly connected therebetween and anti-jack knifing means illustrative of the invention connected between the tractor and trailer units of the vehicle;

Figure 2 is a fragmentary horizontal sectional view of the vehicle assembly taken substantially on the line 2—2 of Figure 1;

Figure 3 is a cross sectional view on an enlarged scale on the line 3—3 of Figure 1;

Figure 4 is a fragmentary cross sectional view on an enlarged scale on the line 4—4 of Figure 1; and Figure 5 is a fragmentary cross sectional view on an enlarged scale on the line 5—5 of Figure 2.

With continued reference to the drawings, tractor and semi-trailer units of well known construction, are generally indicated at A and B respectively. The tractor unit A has a frame 10, a cab 11 mounted on the frame adjacent the front end thereof and a fifth wheel unit 12 mounted on the frame near the rear end of the latter and over the rear driving wheels 13 mounted on the rear axle 14. The frame is supported on the rear axle by the usual springs 15 and 16 and power is supplied from the tractor engine to the rear axle in a manner not illustrated in the accompanying drawings but well known to the art.

The fifth wheel assembly 12 includes a pedestal 17 mounted on the tractor frame, a platform 18 supported on the pedestal and connected thereto by a shaft 19 which extends transversely of the tractor substantially perpendicular to the longitudinal center line of the latter and in a plane substantially parallel to the plane of the top edge of the frame 10. The platform 18 is provided with a slot 19' which terminates substantially at the center of the platform and diverges rearwardly from its end at the center of the platform to provide a guide for facilitating coupling of the trailer vehicle B to the tractor vehicle A.

The trailer B has a frame 20 and a pad or bolster 21 is secured to the underside of the trailer frame 20 near the front end of the trailer and rests on the upper surface of the platform 18 of the fifth wheel assembly mounted on the tractor. A pivot pin 22 extends through the bolster 21 on the trailer and through the platform 18 on the tractor and pivotally interconnects the trailer and the tractor units of the vehicle.

The tractor unit is provided with an air compressor as is well known to the art, and a compressed air line leads from the compressor or from a storage tank to which the compressor is connected to the tractor brake actuating devices, this compressed air line passing through a valve operated by the brake pedal of the tractor, not illustrated, in a manner well known to the art so that the application of compressed air to the tractor brake is controlled by the tractor brake pedal. A compressed air line will also lead from the compressed air supply to the trailer brakes and will be connected either to the pedal operated valve or to a separate manually operated valve to apply the trailer brakes.

As the brake operating mechanism of a tractor-trailer vehicle is well known to the art and constitutes no part of the present invention except in the combination thereof with the anti-jack knifing connection, a more detailed illustration and description of the brake system has been considered unnecessary for the purposes of the present disclosure.

The anti-jack knifing connection of the present invention comprises a pair of hydraulic struts, generally indicated at 25 and 26 respectively and each including an elongated cylinder, as indicated at 27 and 28, pistons, one of which is illustrated in Figure 2 and designated at 29, reciprocable one in each of the cylinders, and piston rods 30 and 31 each extending through one end of a corresponding cylinder and connected at its end within the cylinder to the corresponding piston.

The cylinders 27 and 28 are connected as 27' and 28' to a frame cross member 32 which extends transversely of the trailer frame rearwardly of the kingpin 22 adjacent the midlength location of the cross member 32 and the midwidth location of the trailer vehicle. The cross member 32 is rigidly secured to the trailer frame 20 and the cylinders 27 and 28 extend forwardly from the member 32 and diverge relative to each other substantially symmetrically of the longitudinal center line of the trailer when the center lines of the tractor and trailer are in longitudinal alignment, as illustrated in Figure 2. The piston rods 30 and 31 are connected at their ends 30' and 32' remote from the associated pistons to a rear frame cross member 33 of the tractor vehicle at the respectively opposite ends of this cross member. The cylinders are pivotally connected to the member 32 and the connecting rods are pivotally connected to the cross member 33 so that the trailer can swing about the axis of the kingpin 22 relative to the trailer.

A combined valve and valve actuator 35 is disposed adjacent the cylinder 27 and a similar combined valve and valve actuator, generally indicated at 36, is disposed adjacent the cylinder 28. As these combined valve and valve actuators may be of identical construction, a detailed illustration and description of one only is considered sufficient for the purposes of the present disclosure and the combined valve and valve actuator 35 is illustrated in detail in Figure 3.

The device 35 comprises a bowl shaped housing part 37 having a cavity 38 provided with a flat bottom 39, a transversely curved annular side wall 40 and an outwardly extending annular flange 41 at the edge of the side wall 40 remote from the bottom 39, the surface of the flange 41 being disposed in a plane substantially parallel to the plane of the flat bottom 39 of the housing part. The housing part 37 also includes a formation 42 of substantially cylindrical shape extending diametrically of the flat bottom 39 and provided with a longitudinally extending bore 43 constituting a fluid passage. A bore 44 extends transversely of the formation 42 substantially at the midlength location of the latter and perpendicularly intercepts the bore 43, the bore 44 being preferably of greater diameter than the bore 43, as is clearly illustrated in Figure 3.

A valve plunger 45 is slidably received at one end in the bore 44 and closely fits this bore. This valve plunger is effective to interrupt the passage 43 when the plunger is moved inwardly of the bore 44 to an extent such that it extends across the ends of the bore 43 entering the bore 44.

The bore 43 is provided at the opposite ends of the formation 42 with screw threaded counterbores and pipe or tube fittings 46 and 47 are threaded into these counterbores. A fluid conduit 48 is connected at one end to the cylinder 27 at the end of this cylinder adjacent the trailer frame cross member 32 and is connected at its other end to the tube fitting 46 to connect the interior of the cylinder 27 at the corresponding end of the latter with the bore 43 and a corresponding fluid conduit 49 is connected at one end to the cylinder 27 at the end of the latter remote from the trailer frame cross member 32 and is connected at its other end to the tube fitting 47 to connect the interior of the cylinder at the corresponding end thereof to the bore 43 at the opposite end of the latter.

A body of hydraulic fluid fills the cylinder 27, the conduits or tubes 48 and 49 in the bore 43 and, when the valve plunger 45 is retracted away from the bore 43, as illustrated in Figure 3, the hydraulic fluid may flow freely through the bore 43 from one end of the cylinder to the other and the piston 29 may consequently move freely back and forth in the associated cylinder 27.

Fluid reservoirs, generally indicated at 50 and 51, are connected to the valve and valve actuator devices 35 and 36 respectively and, as illustrated in Figures 3 and 5, each accumulator comprises a housing 52 having ends of generally hemispherical shape. The housing 52 is preferably mounted in upright position and has at the center of its lower end a hollow, externally screw threaded boss 59 threaded into one end of an elbow fitting 60 the other end of which is threaded onto one end of a pipe nipple 61 which is threaded at its other end into an internally screw threaded boss 62 provided on the formation 42 surrounding the transverse bore 44 so that the interior of the housing 52 communicates with the bore 44 and through this bore with the bore 43 of the valve.

The housing 52 is also provided with an internally screw threaded boss 63 at its upper end, and an air admitting valve 64 is threaded into this boss so that air can be forced into the interior of the housing to provide pressure on the fluid in the interior of the housing.

The housing 52 is provided with outwardly projecting fittings 65 and 66 extending one from each end thereof and a glass gauge tube 67 is secured at its ends in these fittings to provide a sight gauge for indicating the mount of hydraulic fluid in the device.

The fluid reservoirs 50 and 51 provide expansion chambers to compensate for temperature contraction and expansion of the hydraulic fluid in the corresponding cylinder and also maintain sufficient pressure on the hydraulic fluid to maintain the cylinders filled at all times and to make up for slight leakage.

Hydraulic conduit tubes or pipes 70 and 71 connect the opposite ends of the cylinder 28 to the opposite ends of the formation 72 on the housing part 73 of the combined valve and valve actuator 36 and the cylinder 28. Conduits 70 and 71 and bore of the formation 72 are also filled with a body of hydraulic fluid and additional fluid is retained in the reservoir 51.

Returning to Figure 3 the combined valve and actuator 35 has a second housing part 75 of circular shape provided with a substantially cylindrical recess 76 having a flat bottom wall 77 and an annular flange 78 extending outwardly therefrom at the open end of the recess 76. The flanges 41 and 78 are disposed in face to face relationship and secured together by bolts or screws 79 which extend through registering apertures spaced apart around the two flanges and a diaphragm 80 of elastic material, such as natural or synthetic rubber, is marginally clamped between the two flanges 41 and 78 and extends across the open ends of the recesses 38 and 76 in the housing parts 37 and 75. The recess 76 has a diameter materially less than the diameter of the open end of the recess 38 so that a part annular ledge or shoulder 81 surrounds the open end of the recess 76 and supports the corresponding portion of the diaphragm 80. This construction gives the diaphragm a somewhat greater freedom of movement in a direction toward the bottom 39 of the recess 38 than toward the bottom 77 of the recess 76.

A tapped hole 82 is provided in the end wall of the housing part 75 opening into the recess 76 through the bottom 77 and a tube fitting 83 is threaded into the hole 82. The valve plunger 45 is secured at its end adjacent the diaphragm 80 to this diaphragm by suitable means as by extending through an aperture in the diaphragm and having annular flanges or washers 84 and 85 thereon disposed at respectively opposite sides of the diaphragm and tightly clamping the diaphragm therebetween. A compression spring 86 surrounds the plunger 45 between the diaphragm and the bottom 39 of the recess 38 and resiliently urges the plunger 45 outwardly of the bore 44.

Referring now to Figure 2 a compressed air pipe or conduit 89 extends between and is connected at its ends to the combined valves and valve actuators 35 and 36, one end of this tube being connected to the fitting 83 carried by the housing part 75 of the device 35 and the other end of the tube being connected to a corresponding fitting 90 carried by the housing part 91 of the device 36.

A tube 92 is connected at one end to the tube or conduit 89 in communication with the interior of the latter and a T fitting 93 is secured at its side connection to the other end of the tube 92.

A compressed air conduit 94 is connected at one end to the compressed air line for the tractor brakes and is connected at its other end to one end of the T fitting 93 while a compressed air conduit 95 is connected at one end to the other end of the T fitting 93 and at its other end to a manually operated valve 96 mounted in the cab 11 of the tractor vehicle. The valve 96 is connected directly to the source of compressed air by a compressed air conduit 97. The T fitting 93, as illustrated in cross section in Figure 4, includes a valve block 98 which is movable between the ends of the compressed air conduits 94 and 95 disposed within the T fitting so that when compressed air is supplied to the T fitting through the compressed air line 94 the block moves into closing relationship with the adjacent end of the line 95, as illustrated in Figure 4, simultaneously connecting the line 94 to the tube or conduit 92. When air is admitted to the T fitting through the compressed air line 95 instead of through the line 94, the block 98 moves into closing relationship with the adjacent end of the line 94 and simultaneously connects the line 95 with the tube 92.

With this arrangement, and assuming that the manually operated valve 96 is closed, if the operator of the vehicle applies the tractor brakes strongly, air from the tractor brake system will flow through the compressed air line 94, the T fitting 93, and the compressed air conduits 92 and 89 to the valve actuating portions of the combined valve and valve actuators 35 and 36 and will move the corresponding plungers 45 into closing relationship with the fluid channel providing bores in the valve portions of the devices 35 and 36. This will restrain the hydraulic fluid from flowing from one end to the other of the cylinders 27 and 28 and will hold the pistons against movement relative to the associated cylinders.

This rigidifying of the struts 25 and 26 tends to hold the trailer vehicle at its current angular position relative to the tractor vehicle and to prevent such excessive turning movements of the two vehicles relative to each other as would result in a "jack-knifing" of the vehicles.

If, without occasion to apply the brakes, the operator feels that a jack-knifing action of the tractor and trailer vehicles may be imminent, he can manually open the valve 96 thereby admitting compressed air directly from the air pressure source to the valve actuator and thereby rigidify the struts 25 and 26 to hold the trailer vehicle against excessive movement relative to the tractor vehicle.

Under both conditions, as soon as the compressed air is released and blown the valves will retract restoring the continuity of the interconnecting passages between the opposite ends of the cylinders 27 and 28 and terminating the rigidity of the struts 25 and 26.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims, are, therefore, intended to be embraced therein.

What is claimed is:

1. In combination with a tractor vehicle, a fifth wheel assembly mounted on the rear portion of said tractor vehicle, a trailer vehicle pivotally mounted at its front end on said fifth wheel assembly, and a compressed air brake line extending from said tractor vehicle, anti-jack knifing means connected between the rear end of said tractor vehicle and the front end of said trailer vehicle and comprising variable length hydraulic struts connected adjacent their rear ends to said trailer vehicle in spaced apart relationship to each other and connected adjacent their opposite ends to the tractor vehicle on opposite sides of the longitudinal axis thereof, each strut including a cylinder pivotally connected at one end to one of said vehicles, a piston slidable in said cylinder, a piston rod extending through said cylinder and connected at one end to said piston and at its other end to the other of said vehicles, a fluid duct connected to each cylinder adjacent the opposite ends thereof to provide freedom of reciprocatory movement of the pistons in their respective cylinders and freedom of turning movements of said vehicles relative to each other, hydraulic fluid filling the cylinders and their respective ducts, a valve connected into each duct and effective when closed to arrest movement of fluid through said duct to thereby rigidify said hydraulic struts, and a pneumatically operated valve actuator connected to each valve and to the compressed air brake line for closing the valves when the brakes of the tractor vehicle are applied.

2. In combination with a tractor vehicle, a fifth wheel assembly mounted on the rear portion of said tractor vehicle, a trailer vehicle pivotally mounted at its front end on said fifth wheel assembly, and a compressed air brake line extending from said tractor vehicle, anti-jack knifing means connected between the rear end of said tractor vehicle and the front end of said trailer vehicle and comprising variable length hydraulic struts extending from one end of said trailer vehicle in spaced apart relationship to each other to the rear end of said tractor vehicle and each including a cylinder pivotally connected at one end to one of said vehicles, a piston slidable in said cylinder and a piston rod connected at one end to said piston and at its other end to the other of said vehicles and extending through the other end of said cylinder, means providing fluid passages extending one longitudinally of each cylinder and interconnecting the opposite ends thereof to provide freedom of reciprocatory movement of said pistons in the corresponding cylinders and freedom of turning movements of said vehicles relative to each other about the axis of said fifth wheel, hydraulic fluid filling each cylinder and the associated fluid passage, valves connected one into each of said passage providing means and effective when closed to cut off one end of each cylinder from the other end and thereby rigidify said hydraulic struts, pneumatically operated valve actuators connected one to each of said valves for closing the latter when subjected to compressed air, and conduit means connecting said compressed air line to said valve actuators to subject the latter to compressed air when the brakes of the tractor vehicle are applied, said struts being pivotally connected to said trailer vehicle substantially at the midwidth location of the latter and extending in diverging relationship to each other and in a forwardly and downwardly inclined direction from said trailer to said tractor vehicle.

3. In combination with a tractor vehicle, a fifth wheel assembly mounted on the rear portion of said tractor vehicle, a trailer vehicle pivotally mounted at its front end on said fifth wheel assembly, and a source of compressed air carried by said tractor vehicle, anti-jack knifing means connected between the rear end of said tractor vehicle and the front end of said trailer vehicle and comprising variable length hydraulic struts extending from one end of said trailer vehicle in spaced apart relationship to each other to the rear end of said tractor vehicle and each including a cylinder pivotally connected at one end to one of said vehicles, a piston slidable in said cylinder and a piston rod connected at one end to said piston and at its other end to the other of said vehicles and extending through the other end of said cylinder, means providing fluid passages extending one longitudinally of each cylinder and interconnecting the opposite ends thereof to provide freedom of reciprocatory movement of said pistons in the corresponding cylinders and freedom of turning movements of said vehicles relative to each other about the axis of said fifth wheel, hydraulic fluid filling each cylinder and the associated fluid passage, valves connected one into each of said passage providing means and effective when closed to cut off one end of each cylinder from the other end and thereby rigidify said hydraulic struts, pneumatically operated valve actuators connected one to each of said valves for closing the latter when subjected to compressed air, a manually operated valve mounted on said tractor vehicle, and conduit means connecting said manually operated valve to the source of compressed air and to said valve actuators.

4. In combination with a tractor vehicle, a fifth wheel assembly mounted on the rear portion of said tractor vehicle, a trailer vehicle pivotally mounted at its front end on said fifth wheel assembly, and a compressed air brake line extending from said tractor vehicle, anti-jack knifing means connected between the rear end of said tractor vehicle and the front end of said trailer vehicle and comprising variable length hydraulic struts extending from one end of said trailer vehicle in spaced apart relationship to each other to the rear end of said tractor vehicle and each including a cylinder pivotally connected at one end to one of said vehicles, a piston slidable in said cylinder and a piston rod connected at one end to said piston and at its other end to the other of said vehicles and extending through the other end of said cylinder, means providing fluid passages extending one longitudinally of each cylinder and interconnecting the opposite ends thereof to provide freedom of reciprocatory movement of said pistons in the corresponding cylinders and freedom of turning movements of said vehicles relative to each other about the axis of said fifth wheel, hydraulic fluid filling each cylinder and the associated fluid passage, valves connected one into each of said passage providing means and effective when closed to cut off one end of each cylinder from the other end and thereby rigidify said hydraulic struts, pneumatically operated valve actuators connected one to each of said valves for closing the latter when subjected to compressed air, conduit means connecting said compressed air line to said valve actuators to subject the latter to compressed air when the brakes of the tractor vehicle are applied, and fluid accumulators connected one to each of said valves, each of said accumulators including a hollow housing providing a fluid receiving chamber connected to the corresponding fluid passage and means for maintaining the pressure of compressed air on the hydraulic fluid in said chamber.

5. In an articulated truck in which a traction vehicle having a braking system is coupled to a trailing vehicle for movement relative thereto about a substantially vertical axis, means for preventing the "jack-knifing" of the vehicles comprising contractable and extensible struts connected adjacent opposite ends to the vehicles on opposite sides of the vertical axis, each strut including a cylinder connected to one of the vehicles, a piston working in each cylinder, a piston rod connected to each piston for movement therewith, said rod extending through one end of its respective cylinder and being connected to the opposite vehicle, a duct connected adjacent opposite ends to each cylinder and communicating with its respective cylinder adjacent opposite ends thereof to form a closed system, non-compressible fluid filling each system, means carried by each duct and operatively connected to the braking system for closing its respective duct and arresting the flow of fluid therethrough to rigidify the strut.

6. In an articulated truck in which a traction vehicle having a source of fluid pressure for actuating its braking system is coupled to a trailing vehicle for movement relative thereto about a substantially vertical axis, means for preventing "jack-knifing" of the vehicles comprising contractable and extensible struts connected adjacent opposite ends to the vehicles on opposite sides of the vertical axis, each strut comprising a cylinder connected to one of the vehicles, a piston working in each cylinder, a piston rod connected to each piston for movement therewith, said piston rod extending through one end of its respective cylinder and being connected to the opposite vehicle, a duct connected adjacent opposite ends to each cylinder and communicating with its respective cylinder adjacent opposite ends thereof to form a closed system, non-compressible fluid filling each system, a valve carried by each duct and operative to close its respective duct and arrest the flow of fluid therethrough to rigidify its respective strut, actuating means carried by each valve and operatively connected thereto for actuating its respective valve and arresting the flow of fluid through its respective system, and a manually actuated valve connected to the actuating means and to the source of fluid pressure for controlling the operation of the actuating means.

References Cited in the file of this patent

UNITED STATES PATENTS

| | | |
|---|---|---|
| 903,884 | Przygode | Nov. 17, 1908 |
| 2,167,943 | Fox | Aug. 1, 1939 |
| 2,201,353 | Soulis | May 21, 1940 |
| 2,461,212 | Hanna | Feb. 8, 1949 |
| 2,470,383 | Wakeman | May 17, 1949 |
| 2,528,076 | Plaxco | Oct. 31, 1950 |
| 2,532,151 | Dibert et al. | Nov. 28, 1950 |
| 2,565,285 | Wakeman | Aug. 21, 1951 |